Dec. 12, 1961    R. S. SOLVIK    3,013,005
CENTRIFUGAL SEPARATION
Filed Oct. 10, 1958
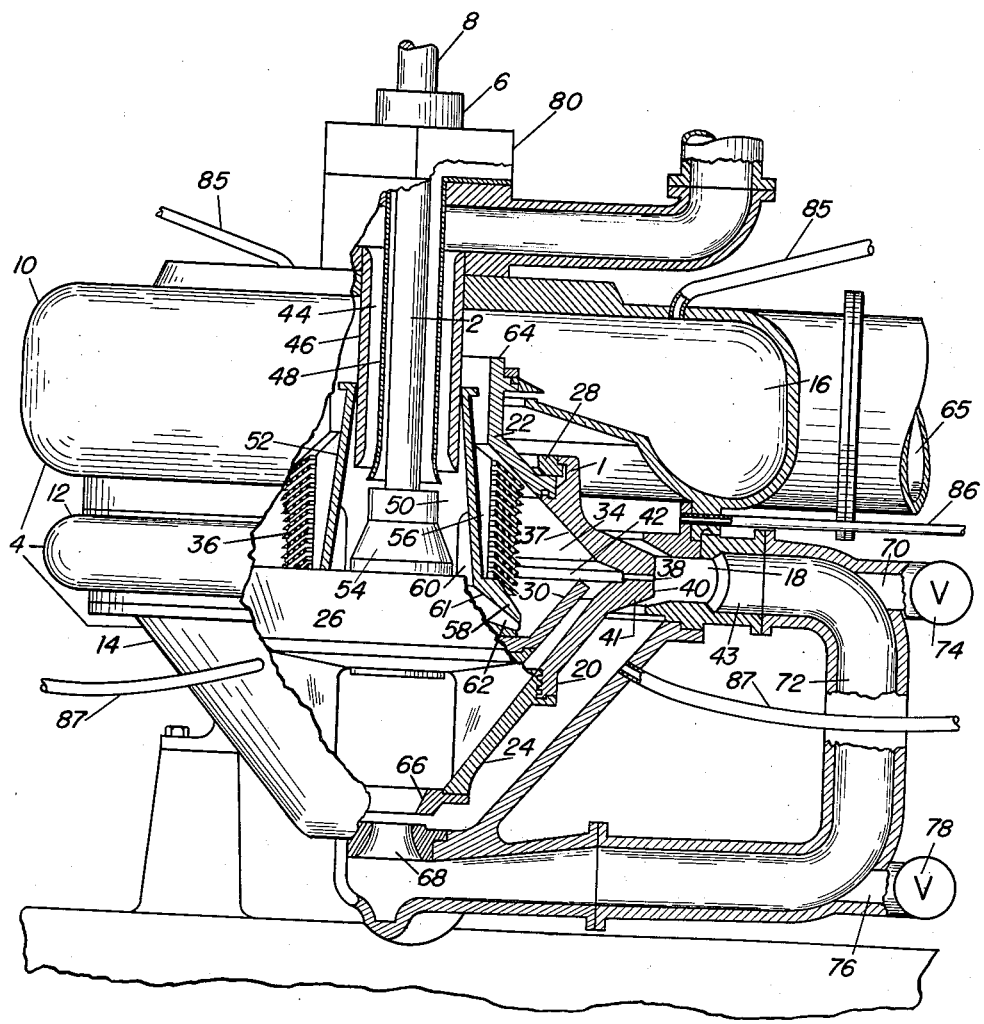
RAGNAR SVEN SOLVIK
*INVENTOR.*
BY Lawrence Rosen
ATTORNEY

United States Patent Office 3,013,005
Patented Dec. 12, 1961

3,013,005
CENTRIFUGAL SEPARATION
Ragnar S. Solvik, Wyoming, Ohio, assignor to National Distillers and Chemical Corporation, New York, N.Y., a corporation of Virginia
Filed Oct. 10, 1958, Ser. No. 766,573
9 Claims. (Cl. 260—94.9)

This invention relates to an improved centrifuging separation method. More specifically, the invention pertains to a method for effecting centrifugal separation at elevated temperatures and pressures.

The application of centrifuges for separating solid components from a feed material containing suspended solids is well known. Apparatus and methods of operation for this type of centrifugal separation are shown in U.S. Patents Nos. 2,525,629, 2,681,180 and 2,779,536. In recent years there has been increased interest in operating the centrifuges under elevated temperatures and pressures in order to realize overall process economies. For example, various catalytic polymerization processes carried out at elevated temperatures and pressures require the separation and recycling of the catalyst particles suspended in the reaction product mixture. Centrifuging has been found to be a particularly effective method for recovering the catalyst particles in the form of a concentrated catalyst solution which could be recycled to the polymerization reaction zone. However, unless the centrifugal separation could take place under the temperature and pressure employed in the polymerization step of the process, the commercial advantages of this method are lost.

The high pressure centrifuges utilized heretofore comprise, in general, a rotating bowl or centrifuge basket enclosed in a high pressure casing. The casing is stationary, and the bowl rotates at speeds of about 2000 to 4000 r.p.m. Rotation is provided by an electrical motor located on the outside of the centrifuge and connected to the bowl by a shaft which is sealed, e.g. mechanical seals, from the stationary casing. In order to prevent the space between rotating bowl and the casing from filling up with the concentrated solids solution being separated, which would result in extremely high power requirements and overheating of the process stream, an inert gas such as nitrogen has been fed to this space. Such an operation has been suggested, for example, in separating catalysts from organic polymer solutions, e.g. polyethylene. It has been found, however, that this method of centrifugal separation is effective only for operating pressures up to about 150 p.s.i. Though the exact reasons for this operational limitation are not fully understood, it is believed that at higher pressures the density of the inert atmosphere surrounding the rotating bowl increases to a point where the power requirements become impractical and overheating is caused as a result of the shear of the rotating bowl.

One object of this invention is to provide a centrifugal separation method which avoids the difficulties encountered in operating the prior art methods at elevated temperatures and pressures. Another object of this invention is to provide a continuous centrifugal separation method for effecting the separation of suspended solids from solutions containing the same at temperatures above 150° C. and at pressures above about 200 p.s.i. A further object of the invention is to provide a centrifugal separation method capable of achieving a high degree of separation of suspended catalyst particles from liquid organic polymer solutions thereby recovering a polymer of improved quality and catalyst particles which can be reused in the polymerization process. Additional objects of the invention will become apparent from the following description and the accompanying drawing.

In accordance with the present invention, it has now been found that by enveloping the rotating bowl with a helium or a hydrogen atmosphere the centrifugal separation can be operated at elevated temperatures and pressures. More specifically, the invention comprises continuously supplying helium or hydrogen to the space between the rotating bowl and stationary casing or housing. As a result of utilizing either of the foregoing gases, it has been found that temperatures within the range of 150° to 300° C. and pressure of about 500 to 5000 p.s.i., preferably about 1000 to 3000 p.s.i., may be employed in the centrifuging zone. It will be understood, however, that lower temperatures or pressures may be employed depending upon the operating conditions employed in the processes with which the present centrifugal separation method is employed in conjunction therewith.

The present invention is especially directed to centrifugal separations involving feed materials comprising homogeneous polymer solutions containing solid catalyst particles suspended therein. Illustrative feed materials included organic solutions of such polymers as polyethylene, polypropylene, ethylene-butene copolymers, ethylene-propylene copolymers and the like. The organic solvent present may encompass aromatic or aliphatic hydrocarbons such as benzene, toluene, xylene, cyclohexane, n-heptane, iso-heptane, octanes, decalin and mixtures thereof. The catalysts particles will include $TiCl_4$, $TiCl_3$, $TiCl_2$, Ti, $Ti(OR)_4$, $VOCl_3$, V, $AlCl_3$, Al, $AlH_3$, $Al(C_2H_5)_3$, $Al(iso-C_4H_9)_3$, molybdenum oxides, chromium oxides and complex metal derivatives. In general, these feed solutions will contain a major proportion of the organic hydrocarbon solvent with the catalyst particles, having a particle size ranging from about 0.1 to 100 microns, present in relatively minor amounts. It will be understood that these and other related polymer solutions are well known, and that there is no intention to restrict the inventive method to handling only the materials enumerated above. Nor is there any intention to tie the inventive centrifugal separation method to any particular polymerization process or catalyst system.

In general, the inventive method is carried out in a nozzle type, multiple discharge centrifuge having a separatory bowl or rotor, a substantially vapor-tight casing or housing, and overflow and underflow discharges. The centrifuge may also be provided with means for recycling a portion of the underflow discharge to obtain increased efficiency. The feed material, consisting of a homogeneous polymer solution having solid catalyst particles suspended therein, is fed to the centrifuge bowl, which is operated at a speed of about 1500 to 10,000 r.p.m. depending on the size of centrifuge, resulting in centrifugal forces thousands of times higher than gravity. The catalyst particles are forced to the periphery of the bowl, where they are expelled through fixed open nozzles located around the bowl. The substantially catalyst-free polymer solution is continuously withdrawn from the center of the bowl. As described above, a portion of the cencentrated catalyst solution taken off at the periphery of the bowl may be returned to the rotor, if desired, with the remaining portion being recycled to the polymerization step.

For a more complete understanding of the invention, reference will now be made to the drawing which is a schematic showing, partially sectioned and somewhat diagrammatic, of a nozzle type centrifuge useful in carrying out the centrifugal separation method of this invention.

The structure of the nozzle-type centrifuge shown in the drawing consists generally of a rotor 1 supported by a vertical shaft 2 within stationary casing 4. As described below, the rotor is provided with various fluid passages including an inlet for the fluid feed material, an outlet for discharge of the lighter centrifugally separable component of the feed material, known as overflow, and an outlet for the heavier centrifugally separable component of the feed material, known as underflow. The rotor 1 is supported and driven by vertically disposed shaft 2 which is connected by a coupling 6 to a vertically coaxially aligned motor driven shaft 8, which is journalled at its upper end in a resiliently mounted assembly (not shown).

Housing 4 can be conveniently formed of a plurality of separable sections 10, 12 and 14. Section 10 forms a volute or annular chamber 16 for receiving the centrifugally separated overflow discharge from rotor 1 and 12 is formed to provide a volute or annular chamber 18 for receiving the underflow discharge from the rotor.

The body of rotor 1 is also preferably made of a number of separable annular parts including a main part 20 and mating upper and lower conical-shaped parts 22 and 24, respectively. Part 20 is secured to the inner or bowl-like portion 26 of the rotor structure which is attached to the lower end of the rotor shaft 2. Parts 20 and 22 are retained together by suitable means, such as an expandable clamping ring 28. The inner structure 26 is formed with an upwardly facing truncated conical surface 30, which with an opposed downwardly facing truncated conical surface 37 on the main rotor part 20 defines a centrifuge or separating chamber 34.

A stack of axially spaced annular separating discs 36, which are of conventional, truncated conical form, is mounted in chamber 34 coaxial with shaft 2. A plurality of equiangularly spaced underflows discharge nozzles 38, each of which is provided with a discharge orifice directed backwardly with respect to the direction of rotation of rotor 1, are formed through the outer peripheral wall 40 of the main rotor part 20.

The peripheral portion of the main rotor part 20 extends within the throat 41 of the volute chamber 18 formed by housing part 12.

The underflow passes over the upper edge of the bowl-like member 26 into the annular channel 42, from which it is discharged through the nozzles 38 into the underflow receiving volute 18 of housing member 12. The underflow passes continuously from underflow volute 18 through pipe 43.

Feed solution containing suspended solids is supplied to rotor 1 through an annular channel 44 defined between the pair of coaxially aligned tubular members 46 and 48. Channel 44 discharges downwardly into a receiving chamber 50 defined between annular member 52 and the rotor mounting structure 54, centrally secured to the bowl-like inner rotor portion 26.

It is upon this annular member 26 that the stack of separating discs 36 is supported by a plurality of spaced radially extending vertical ribs 56. The lower portion 58 of member 52 is outwardly flared below the lowest of the stack of separating discs 36. The inner wall of annular member 52 is provided with a plurality of circumferentially spaced, inwardly extending vanes 60, which extend vertically from the upper internal edge 61 of the flared lower portion 58 to the upper end of member 52. These vanes serve as impellers to impart rotary movement to the feed solution from annular channel 44. The feed solution passes from the receiving chamber 50 to the main separating chamber 34 through a plurality of converging passages 62 formed through the flared lower portion 58 of member 52.

The upper rotor section 22 extends upwardly beyond the top of member 52 and is formed with an annular lip 64 at its upper end over which the overflow, which is fed upwardly through the stack of discs 36 from chamber 34, is discharged. This overflow material is received from the orifice formed by lip 64 in the overflow volute chamber 16 from which it is continuously discharged through outlet pipe 65.

The centrifuge shown is adapted for the return of a portion of the underflow to the rotor from the underflow receiving volute chamber 18. The lower portion 24 of rotor 1 forms an impeller for the return of heavier, centrifugally separated underflow back into the centrifuge chamber. The lower end of rotor part 24 is provided with a coaxially aligned opening 66 directly above an upwardly directed nozzle 68, carried by the lower part 14 of the housing 4 to direct a jet or solid stream of underflow materials upwardly into the rotor 1 through the opening 66.

Pipe 43, which receives the underflow from underflow volute chamber 18, branches into channels 70 and 72. Channel 72 directs a portion of the underflow back into the rotor through nozzle 68 while channel 70 carries the remainder of the underflow from the centrifuge through control valve 74. Wash liquid may be introduced into channel 72 via duct 76 controlled by valve 78 for flow to the rotor.

In order for the rotor to be enveloped with hydrogen or helium, in accordance with this invention, the housing must be made substantially vapor-tight. This is accomplished by interposing suitable sealing elements (not shown) between the mating edges of the housing sections 10, 12 and 14, and interposing a rotary sealing element 80 between shaft 2 and the portion of housing section 10 immediately surrounding it. The helium or hydrogen gas is preferably introduced into the housing 4 through a plurality of gas conduits opening into the housing through the walls thereof at spaced points. A plurality of conduits such as 85, equiangularly spaced around the housing section 10 for introduction of helium or hydrogen into the overflow receiving volute chamber 16; a plurality of conduits 86, spaced equiangularly around housing 4 and opening thereinto intermediate overflow receiving volute chamber 16 and overflow receiving volute chamber 18; and a plurality of conduits 87, opening into housing 4, provide an entirely adequate hydrogen or helium gas distribution for envelopment of rotor 1. It will be understood, however, that the manner of introducing the helium or hydrogen may be varied to suit the particular centrifuge employed and the separation desired. In a large centrifuge operation it is desirable to send the centrifugal process fluid to a receiver, which separates entrained helium or hydrogen gas and which is connected to the centrifuge so as to enable recycling of the recovered gas.

In order to illustrate a typical separation performed in accordance with the inventive method, a preferred embodiment is described below.

EXAMPLE

A homogeneous solution of polyethylene polymer in cyclohexane containing suspended catalyst particles resulting from the interaction of $TiCl_4$ and $Al(Et)_3$ having the composition set forth in the following table, is fed continuously to the centrifuge system shown in the drawing and described in detail above. The polyethylene solution is at a temperature of about 240° C. and a pressure of about 2500 p.s.i., having been recovered directly from a polymerization reaction zone operated at this temperature and pressure.

Rotor 1 is rotated at a rate of about 8500 r.p.m., and the centrifugal separation is carried out at a temperature of about 250° C. and a pressure of about 2500 p.s.i. Helium is fed into the space between the rotor and the housing at a rate of about 0.1 p.p.h. (pound per hour) and at a temperature of about 30° C. During the separation the overflow material is recovered via outlet pipe 65 at a temperature of about 250° C. and a pressure of about 2500 p.s.i. The underflow material is recovered via outlet pipe 70 at a temperature of about 250° C. and a pressure of about 2500 p.s.i.

The rates of feed and removal as well as the composition of the various streams are delineated in the following table:

Table

|  | Feed, p.p.h. | Overflow, p.p.h. | Underflow, p.p.h. |
|---|---|---|---|
| Polyethylene | 4.0 | 3.8 | 0.2 |
| Cyclohexane | 40.0 | 38.0 | 2.0 |
| Catalyst | 0.03 | 0.0004 | 0.0296 |
| Helium | 0.1 | 0.09 | 0.01 |

The above data show that by operating in accordance with the method of this invention an efficient, continuous centrifugal separation can be carried out at temperatures and pressures which were prohibitive heretofore. The data also show that the concentrated catalyst solution, the underflow, could be recycled directly to the polymerization step.

As previously discussed, the exact theory behind the operability of helium and hydrogen as enveloping gases as compared to other gases is not entirely known. It appears, however, that the density of the enveloping gas should not exceed about 2 lbs. per cubic foot. Calculations indicated that helium and hydrogen should have densities, when utilized with the centrifuge and in the presence of the feed material described in the example, of about 6.9 lbs./cu. ft., and 0.8 lbs./cu. ft. respectively. Actual experimentation with helium showed a much lower density value of 0.9 lbs./cu. ft.

The particular feed and withdrawal rates employed in the inventive method are not critical. It is essential, however, to utilize sufficient helium or hydrogen to ensure continuous envelopment of the centrifuge rotor. Additional experiments have shown that the same centrifugal separation is achieved when the polymerization medium is either benzene of n-heptane.

While a particular embodiment is shown above, it will be understood that the invention is not necessarily limited thereto, since modifications may be made without departing from the scope of this invention.

What is claimed is:

1. In a method of centrifugally separating a fluid feed material containing suspended solids, characterized by the use of a multiple discharge centrifuge embodying a separatory rotor, the improvement which comprises utilizing a temperature above about 150° C. and a pressure above about 500 p.s.i. and enveloping said rotor with a gas selected from the group consisting of helium and hydrogen.

2. The method of claim 1 wherein said gas is helium.

3. The method of claim 1 wherein said gas is hydrogen.

4. In a method of centrifugally separating suspended catalyst particles from an organic solution of a polymer, characterized by the use of a multiple discharge centrifuge embodying a separatory rotor, the improvement which comprises utilizing a temperature within the range of about 150° to 300° C. and a pressure of about 500 to 5000 p.s.i. within said centrifuge during said separation and in enveloping said separatory rotor with a gas selected from the group consisting of helium and hydrogen.

5. The process of claim 4 wherein said polymer is polyethylene.

6. The process of claim 4 wherein said gas is helium.

7. The process of claim 4 wherein said gas is hydrogen.

8. A process for the preparation of an organic polymer which comprises the following steps (a) in a reaction zone, heating under elevated temperatures and pressures at least one polymerizable organic compound in the presence of finely divided, solid catalyst particles; (b) recovering from said reaction zone an organic polymer solution containing a portion of said catalyst particles suspended therein; (c) separating said catalyst particles from the organic polymer in a multiple discharge centrifuge, embodying a separatory rotor, at an elevated temperature of about 150° to 300° C. and an elevated pressure of about 500 to 5000 p.s.i. within said centrifuge while enveloping said separatory rotor with a gas selected from the group consisting of helium and hydrogen; and (d) recycling said separated catalyst particles, while maintaining said elevated temperature and pressure, back to said reaction zone.

9. The process of claim 8, wherein said organic polymer is polyethylene.

References Cited in the file of this patent

UNITED STATES PATENTS

| 2,173,717 | Hobart | Sept. 19, 1939 |
| 2,691,647 | Field et al. | Oct. 12, 1954 |
| 2,779,536 | Pomeroy | Jan. 29, 1957 |
| 2,905,380 | Mathews | Sept. 22, 1959 |